United States Patent [19]

Kondo

[11] 4,090,209
[45] May 16, 1978

[54] AUTOMATIC IMAGE FOCUSING SYSTEM FOR CAMERAS

[75] Inventor: Toshihiro Kondo, Kamiishihara, Chofu-shi, Tokyo, Japan

[73] Assignees: Fuji Photo Film Co., Ltd., Minami-ashigara; Toshihiro Kondo, Tokyo, both of Japan

[21] Appl. No.: 754,699

[22] Filed: Dec. 27, 1976

[30] Foreign Application Priority Data

| Dec. 26, 1975 | Japan | 50-157495 |
| Feb. 12, 1976 | Japan | 51-14322 |
| Aug. 3, 1976 | Japan | 51-92473 |
| Aug. 4, 1976 | Japan | 51-92894 |

[51] Int. Cl.² .............................................. G03B 3/10
[52] U.S. Cl. ..................................... 354/25; 352/14 D
[58] Field of Search ...................... 354/25; 352/14 D; 250/201

[56] References Cited

U.S. PATENT DOCUMENTS

| 2,258,903 | 10/1941 | Mitchell | 352/14 D X |
| 3,367,254 | 2/1968 | Townsley | 354/25 |
| 3,631,785 | 1/1972 | Perlman et al. | 354/25 |
| 3,691,922 | 9/1972 | Konig et al. | 354/25 |
| 3,896,457 | 7/1975 | Yamamishi et al. | 354/25 |

OTHER PUBLICATIONS

Automatic Focusing by Peter MacKeith, Brit. J. of Photo., Jul. 4, 1975, pp. 594-596.

*Primary Examiner*—L. T. Hix
*Assistant Examiner*—M. L. Gellner
*Attorney, Agent, or Firm*—Gerald J. Ferguson, Jr.; Joseph J. Baker

[57] ABSTRACT

A light refracting optical element such as a prism is inserted in the optical path of the objective of a camera substantially on the focal plane of the objective. The light refracting optical element is mounted on a transparent plate and periodically moved in a plane perpendicular to the optical path. A photodetector is provided on which an image of the real image formed by the objective is focused by way of a focusing lens. The photodetector is connected to an electric circuit which amplifies an alternating current component of the output of the photodetector. When the real image of the objective is formed on the light refracting optical element, the output of the photodetector does not contain an alternating component. When the real image of the objective is formed on a plane displaced from the light refracting optical element, the output of the photodetector contains an alternating current component having the same frequency as that of the periodical movement of the light refracting optical element.

4 Claims, 47 Drawing Figures

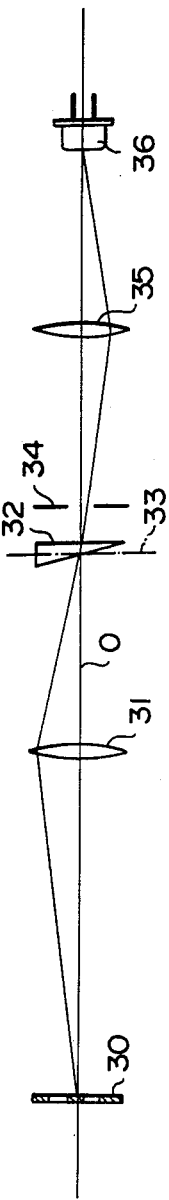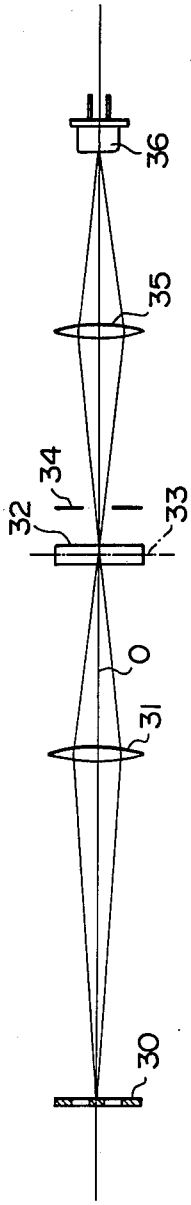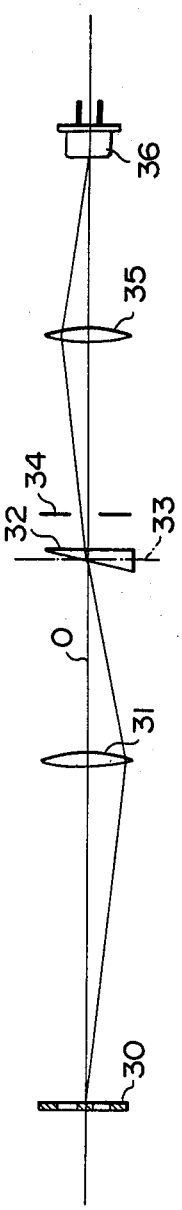

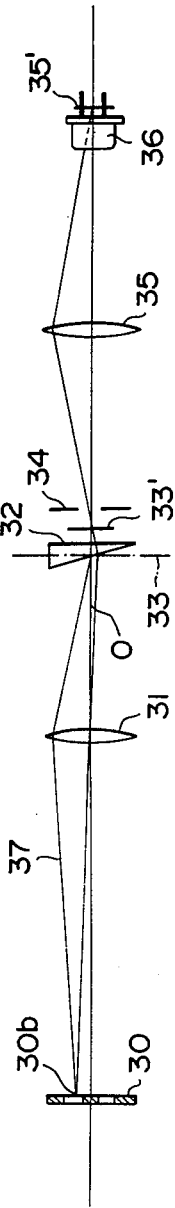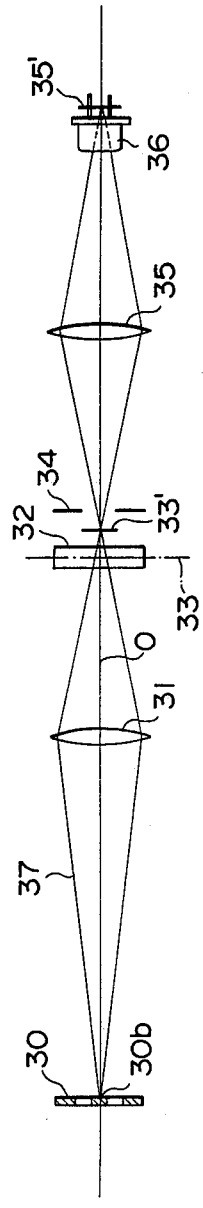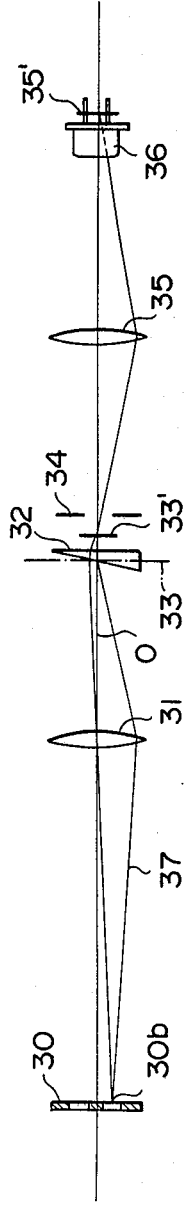

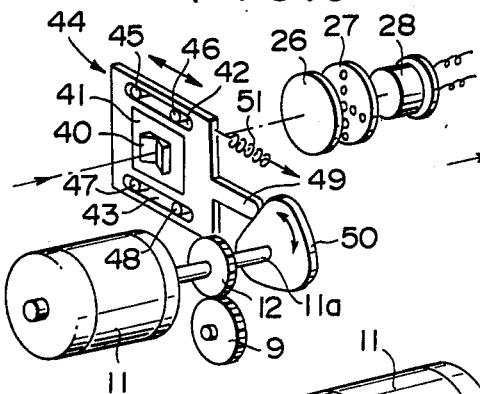
FIG.5
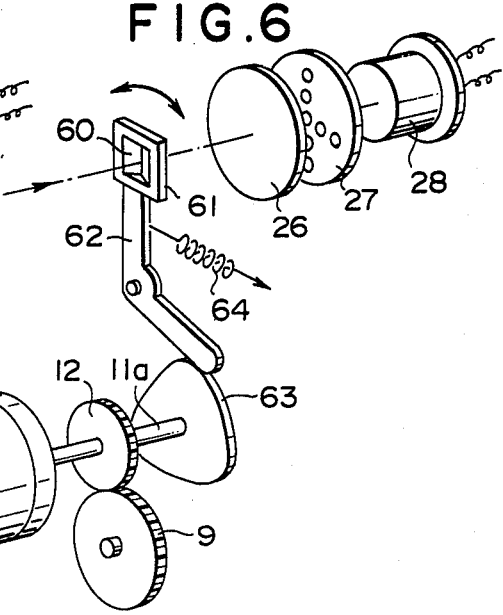
FIG.6
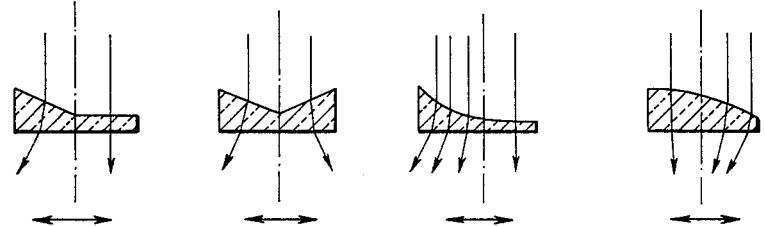
| FIG.7A | FIG.7B | FIG.7C | FIG.7D |
|---|---|---|---|
| 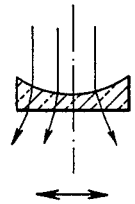 | 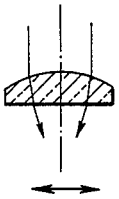 | 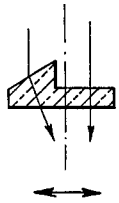 | 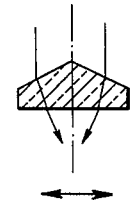 |
| FIG.7E | FIG.7F | FIG.7G | FIG.7H |
| 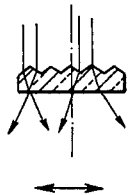 | 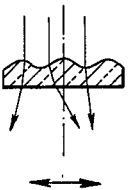 | 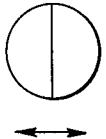 |  |
| FIG.7I | FIG.7J | FIG.8A | FIG.8B |

FIG.9A 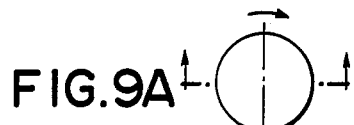   FIG.10A 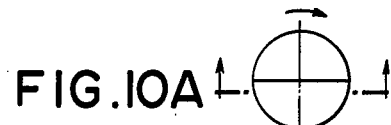
FIG.9B    FIG.10B 
FIG.11A       FIG.11B
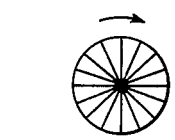   
FIG.12A    FIG.12B    FIG.12C   FIG.12D
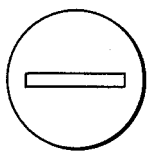  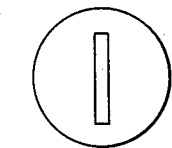  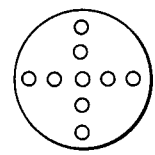  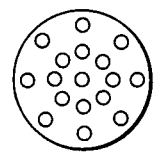
FIG.12E    FIG.12F    FIG.12G
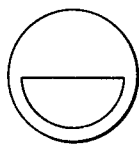  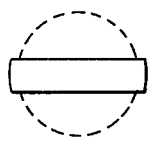  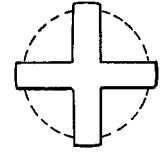
FIG.15A
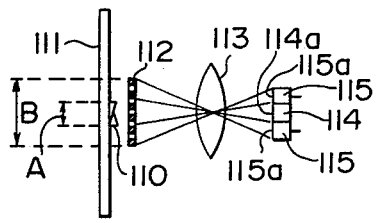

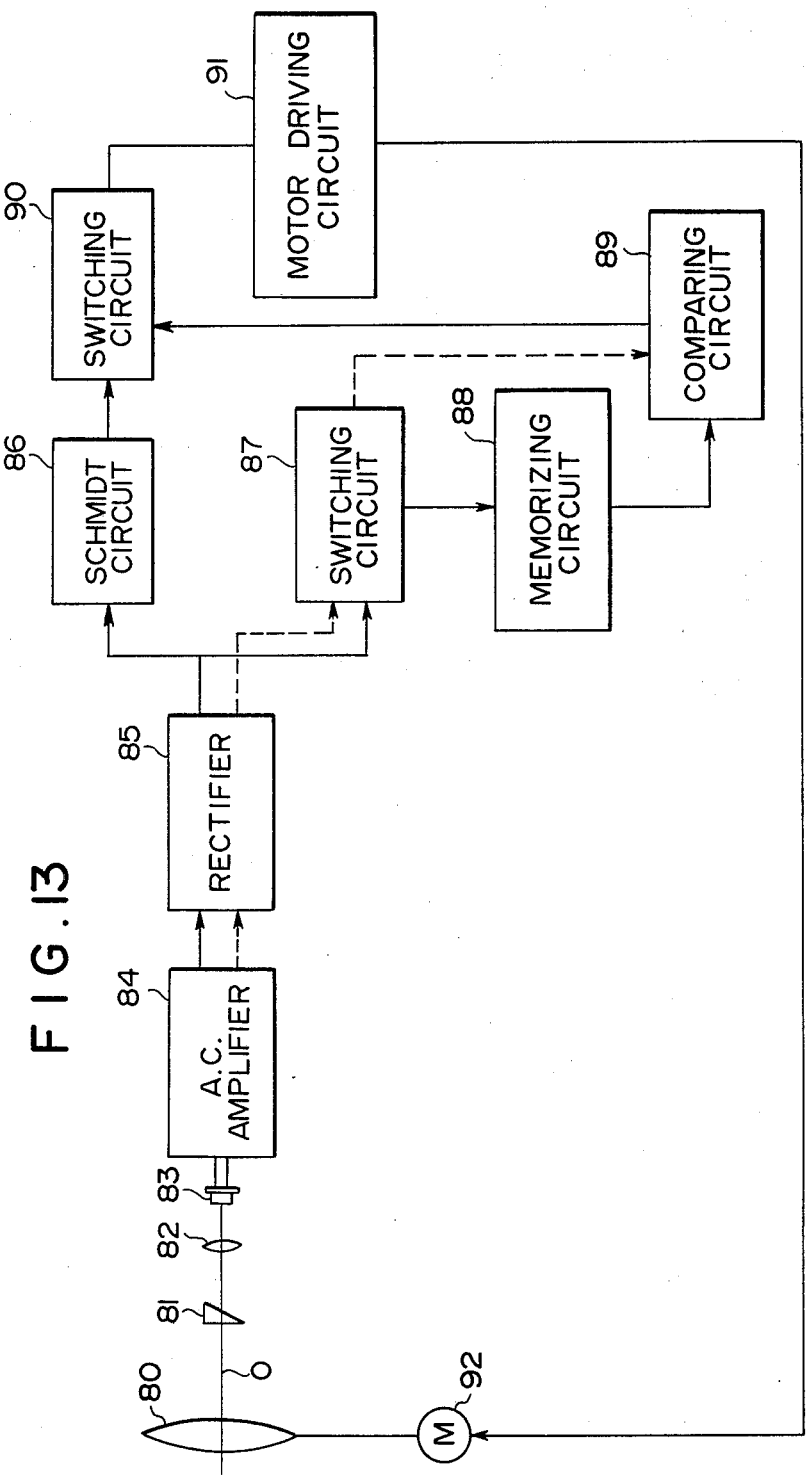

AUTOMATIC IMAGE FOCUSING SYSTEM FOR CAMERAS

BACKGROUND OF THE INVENTION

1. Field of the Invention

This invention relates to a device for automatically focusing a lens in a camera, and more particularly to a device for automatically adjusting the focus of an image formed by an objective in a photographic or cinematographic camera. This invention further relates to a device for indicating the position where an image is focused by an objective to facilitate the focusing of an image in a camera.

2. Description of the Prior Art

In a conventional camera, the position at which an image is focused is visually determined by the photographer who adjusts the focus by manually operating a focusing lens. This requires high degree of skill and good eyesight. Therefore, it has been desired that the focusing operation of a camera be automatically conducted by use of automatic focusing means. Various attempts have been made to automatically focus an image in a camera. The conventionally known means for automatic focus control employs a photodetector on which the image to be focus-controlled is formed and utilizes the output from the photodetector which shows the maximum value when the image is best focused.

The above described conventional automatic focus control means has a defect in that the response is slow. Particularly when the scene is dark, the photodetector is required to have very fast response and high sensitivity. Further, since in the conventional automatic focus control means any fluctuation in the quantity of light received by the photodetector constitutes noise in the output from the photodetector, it is difficult to precisely detect the focus and control the lens.

SUMMARY OF THE INVENTION

The primary object of the present invention is to provide a device for automatically focusing an image formed by an objective of a camera or the like which has high response and high sensitivity even for a dark scene.

Another object of the present invention is to provide a device for automatically focusing an image formed by an objective of a camera or the like capable of accurately focusing an image even when the scene contains a fluctuating component which results in fluctuation in the quantity of light passing through the objective.

Still another object of the present invention is to provide a device for detecting and indicating the position where the image formed by an objective in a camera or the like is best focused.

A further object of the present invention is to provide an automatic image focusing device for use in a motion picture camera wherein a motor in the camera used for driving a shutter and a film feeding mechanism is utilized for driving a movable member of the automatic image forming device.

A still further object of the present invention is to provide an automatic image focusing system for use in a motion picture camera which is capable of indicating the condition of the focus of the image formed by the objective as well as automatically focusing the image in the camera.

The above objects are accomplished by providing a light refracting optical element such as a prism in the optical path of the objective of the camera or the like substantially on the focal plane of the objective and periodically moving the light refracting optical element in a plane perpendicular to the optical path. A photodetector is provided behind the light refracting optical element to receive light passing through the element. A real image of the real image formed by the objective is focused on the photodetector by means of a focusing lens. The photodetector is connected to an electric circuit which amplifies and detects an alternating current component contained in the output of the photodetector. When the real image formed by the objective is precisely focused on the light refracting optical element, the output of the photodetector contain no alternating current component beside that which may be present because of the periodical movement of something included in the scene. When the real image formed by the objective is focused on a plane displaced from the light refracting optical element, the output of the photodetector contains an alternating current component which has the same frequency as that of the periodical movement of the light refracting optical element.

In a preferred embodiment of the invention, the response of the automatic image focusing means is enhanced by an improved electric circuit connected with a servomotor for operating a focusing ring or a focusing lens. In the improved circuit, there is provided a direction detecting means which first detects the direction in which the servomotor is to be rotated so that it is made unnecessary to return the focusing lens to its extreme position before focusing the image. Without such a means, the focusing lens must be returned to its extreme starting position every time the focusing is conducted.

BRIEF DESCRIPTION OF THE DRAWING

FIGS. 2A to 2C are optical diagrams which show how the light flux behaves when an image is focused on a light refracting optical element in an optical system employed in the present invention, FIGS. 3A to 3C are optical diagrams similar to FIGS. 2A to 2C which show how the light flux behaves when an image is focused on a plane behind the light refracting optical element, FIG. 5 is a perspective view showing a different example of a mechanism for periodically moving a light refracting optical element in a camera or the like, FIG. 6 is a perspective view showing still another example of a mechanism for periodically moving a light refracting optical element in a camera or the like, FIGS. 7A to 7J are cross-sectional views of various examples of the light refracting optical element which can be used in the present invention, FIGS. 8A and 8B are front views of the examples of the light refracting optical element which can be used in the present invention, FIGS. 9A and 9B are front and cross-sectional views respectively of a light refracting optical element, FIGS. 10A and 10B are front and cross-sectional views respectively of another light refracting optical element, FIGS. 11A and 11B are front and perspective views of still another example of a light refracting optical element, FIGS. 12A to 12C are front view of an optical mask which can be used in an embodiment of the device in accordance with the present invention, FIG. 13 is a circuit diagram which shows an example of an automatic image focusing circuit connected with a photodetector in accordance with a preferred embodiment of the present invention, FIG. 15A is a side view showing an example of an optical arrangement in which an image formed on a light refracting optical element is focused on a photodetector.

PREFERRED EMBODIMENTS OF THE INVENTION

Figure 1:
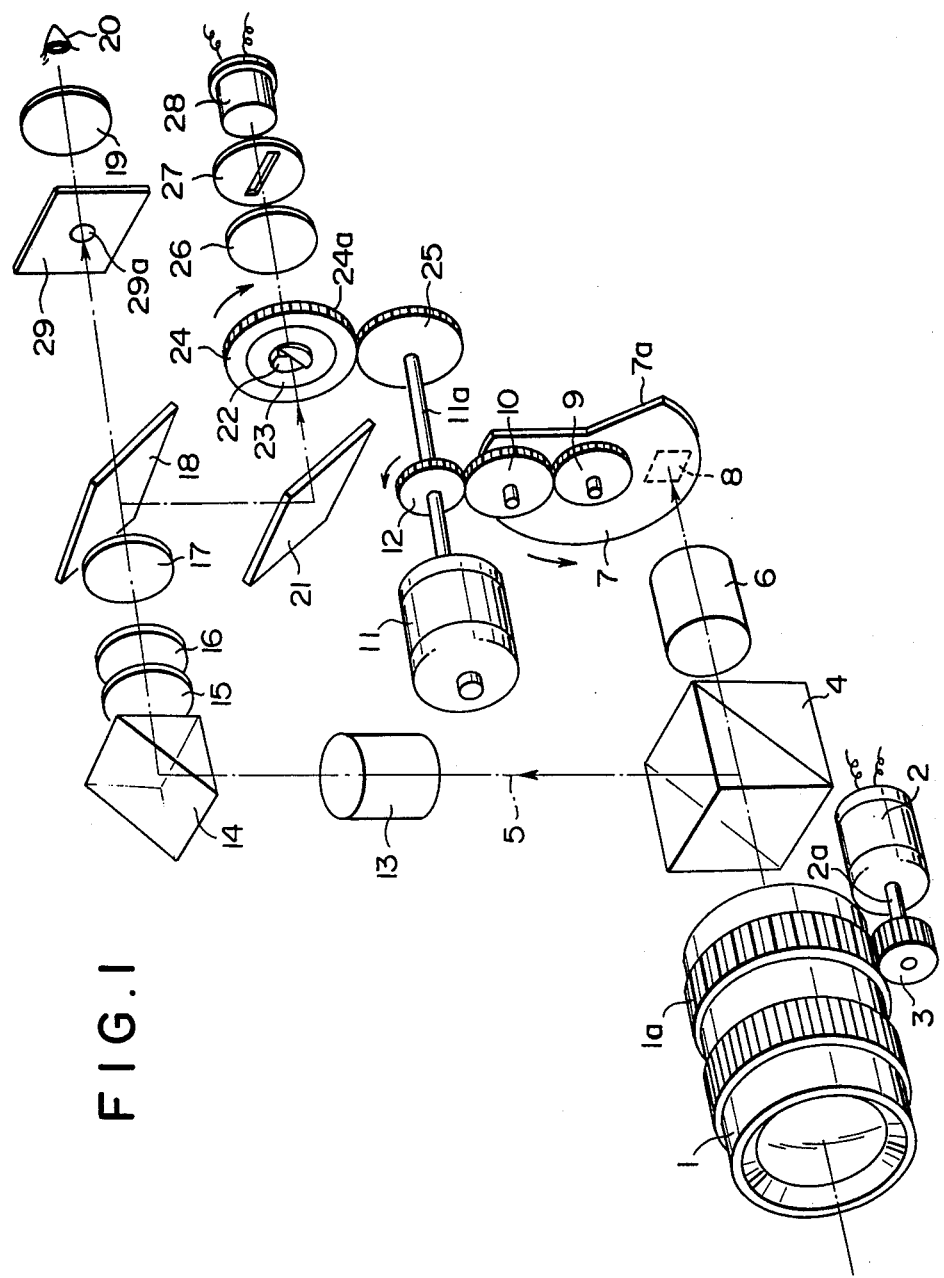
FIG. 1 is a perspective view showing a preferred embodiment of the automatic focusing system in accordance with the present invention incorporated in a motion picture camera.

A preferred embodiment of the present invention which is incorporated in a motion picture camera is shown in FIG. 1. An objective 1 consisting of a focusing lens group and a zooming lens group is provided with a focusing ring which is rotated to move the focusing lens group axially to focus an image on a film in the camera. The focusing ring has a gear 1a therearound meshed with a pinion 3 fixed to a shaft 2a of a servomotor 2 so that the focusing ring is rotated by the servomotor 2 to move the focusing lens group axially. The servomotor 2 is rotatable in both directions to rotate the gear 1a in both directions. The direction of rotation is determined by a signal given thereto from a control circuit connected therewith which will be described in detail hereinafter. The servomotor 2 is driven by a signal from the control circuit and stops where the objective 1 focuses an image of an object to be cinematographed precisely on a film in the camera.

Behind the object 1 is located a beam splitter 4 which transmits light from the objective 1 toward the film in the camera and partially reflects the light from the objective 1 toward a view-finder system. The light reflected by the beam splitter 4 is indicated with a reference numeral 5.

The light transmitting through the beam splitter 4 passes through a relay lens 6 and then impinges upon a film (not shown) when an open section 7a of a rotary shutter 7 is aligned with a film aperture 8 which is provided in front of the film. The rotary shutter 7 has a gear 9 fixed thereto to rotate together therewith. The gear 9 is meshed with a relay gear 10 which is in turn meshed with a drive gear 12 fixed to a drive shaft 11a of a drive motor 11. Thus, the rotary shutter 7 is rotated by the drive motor 11 to periodically open and close the film aperture 8 to expose the film and drive a film feeding mechanism (not shown) to intermittently feed the film.

The light reflected by the beam splitter 4 passes through a view-finder objective 13 and is reflected by a prism 14. The light reflected by the prism 14 passes through field lenses 15 and 16 and an erector lens 17 and then an eyepiece 19 to be viewed with an eye 20 of the photographer. Between the erector lens 17 and the eyepiece 19 is provided a half transparent mirror 18 to partially reflect the light from the field lenses 15 and 16 toward a mirror 21 which reflects the light from the half transparent mirror 18 backward in parallel to the light passing through the half transparent mirror 18. On a focal plane of the lens system of the view-finder optical system which is conjugate with the plane of the film in the camera, is provided a light refracting optical element 22 similar to the image splitting prism combination that is employed in the conventional split-image type focusing plate. The light refracting optical element 22 (hereinafter referred to simply as "refraction element" or "vibrating prism") is fixed to a transparent disc 23 supported by an annular frame 24 which carries on the periphery thereof teeth 24a that are meshed with a gear 25 fixed to said drive shaft 11a of the drive motor 11. Thus, the refraction element 22 is rotated about the optical axis of the light reflected by the mirror 21 as the motor 11 rotates. Behind the refraction element 22 are provided a focusing lens 26, an optical mask or slit 27 and a photodetector 28 on which the image of the real image focused on said focal plane around the refraction element 22 is focused. Behind the half transparent mirror 18 is provided a target plate 29 at a position conjugate with the refraction element 22. The target plate 29 has at the center thereof a circular mask 29a which indicates that the part of the scene or object enclosed with the circular mark 29a is focus-detected and automatically focused. The circular mark 29a, therefore, corresponds to the circular refraction element 22.

In the above described embodiment, it will be noted that the half transparent mirror 18 may instead be inserted between the refraction element 22 and the focusing lens 26 so that the image formed on the refraction element 22 can be viewed through the eyepiece 19. In this case, of course, the mirror 21 is not provided in front of the refraction element 22 but is provided in the optical path of the light reflected by the half-transparent mirror 18 inserted behind the refraction element 22.

Now the operation of the above described embodiment will be described in detail with reference to FIG. 1. As the motor 11 rotates, the rotary shutter 7 rotates to intermittently cause the film to be exposed to light from objective 1 and the refraction element 22 rotates about the optical axis of the light reflected by the mirror 21. As the refraction element 22 rotates, the direction of refraction effected by the element 22 varies. When the image formed by the optical system of the view-finder system 13-17 is focused precisely on the refraction element 22, the image focused on the photodetector 28 does not move at all. On the other hand, when the image is not focused on the refraction element 22, that is, when it is focused on a plane displaced from the refraction element 22, the image focused on the photodetector 28 periodically moves laterally on the photodetector 28. More precisely, when the image is not focused on the refraction element 22, that is, when the image is not focused on the film in the camera, the image formed on the photodetector 28 periodically moves in a circle on a plane perpendicular to the optical axis of the light received by the photodetector 28. Therefore, the quantity of light passing through the optical mask 27 and received by the photodetector 28 fluctuates periodically. The fluctuating quantity of light received by the photodetector 28 results in a fluctuating output signal electrically taken out from the photodetector 28. Since the refraction element 22 rotates at a constant speed, the output level of the signal taken from the photodetector 28 is periodically changed. Thus, when the image is not focused on the film, the output of the photodetector 28 contains an alternating current component having a frequency equal to the frequency of rotation of the refraction element 22. Therefore, by detecting the position where the output of the photodetector 28 does not have an alternating current component, the position where the image is correctly focused on the film can be found. By connecting the detecting circuit to a servomotor control circuit, it is made possible to automatically focus the image on the film. The electric circuit for detecting the focus and controlling the servomotor will be described in detail hereinafter.

Now the principle of the present invention will be explained in detail with reference to FIGS. 2A to 4C. FIGS. 2A to 2C show how the flux of light behaves when the image is focused on the refraction element and the element is rotated. The light from the center of an object 30 advances along the optical axis O of an objective 31 and impinges on a photodetector 36 at its center by way of a prism 32 and a focusing lens 35. The image of the object 30 is focused on a focal plane 33 located on the prism 32 in this case and the image focused on the focal plane 33 is again focused on the photodetector 36 by way of a mask or slit 34 and the focusing lens 35. Since the center of the object 30 is focused at the center of the photodetector 36, the image focused on the photodetector 36 does not move even if the prism 32 rotates about the optical axis O in the focal plane 33.

FIGS. 3A to 3C show the same optical system as in FIGS. 2A to 2C but with the objective 31 closer to the rotating prism 32 than in FIGS. 2A to 2C. In this case, the image of the object 30 is focused on a plane 33' displaced from said focal plane 33 to the photodetector and the image focused on the displaced plane 33' is focused by the focusing lens 35 on a plane 35' displaced from the surface of the photodetector 36. As shown in the drawing, a light beam 37 from a point 30b displaced upward from the center of the object 30 advances along the optical axis O after it has passed the displaced focal plane 33' and accordingly impinges upon the center of the photodetector 36. As the prism 32 rotates, the position of the point of the object 30 which is focused at the center of the photodetector 36 changes. As shown in FIG. 3C, when the prism 32 is rotated by 180° from the position in FIG. 3A, the position of the point 30b of the object 30 focused at the center of the photodetector 36 is below the optical axis O. More precisely, in these cases as shown in FIGS. 3A to 3C the image is not exactly focused on the photodetector 36 but on the plane 35' displaced behind the photodetector 36. Since the point of the object 30 which is focused substantially at the center of the photodetector 36 changes as the prism 32 rotates, the quantity of light received by the photodetector 36 through the mask or slit 34 periodically changes. Therefore, the output of the photodetector 36 contains an alternating current component in this case.

Figure 4A:
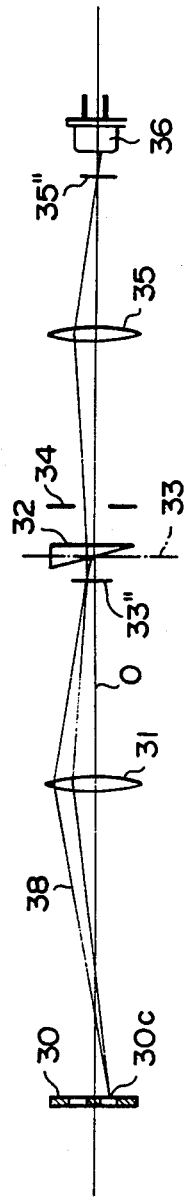
FIGS. 4A to 4C are optical diagrams similar to FIGS. 2C to 2C which show how the light flux behaves when an image is focused on a plane in front of the light refracting optical element.
Figure 4B:
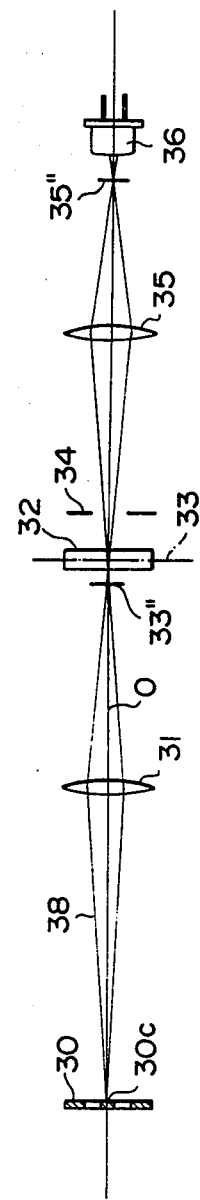
Figure 4C:
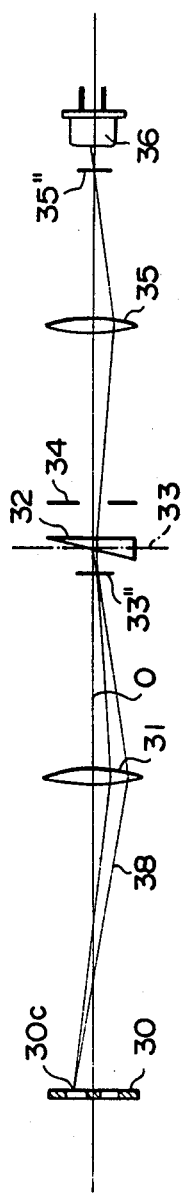

When, as shown in FIGS. 4A to 4C, the objective 31 is moved apart from the prism 32 from the correct focusing position as shown in FIG. 2A to 2C, the image of the object 30 is focused on a plane 33" displaced toward the objective 31 from said focal plane 33 in FIGS. 2A to 2C. As clearly shown in FIGS. 4A to 4C, when the image of the object 30 is focused on a plane 33" displaced forwardly from the focal plane 33, a light beam 38 from a point 30c displaced downward from the center of the object 30 advances along the optical axis O after it has passed the prism 32 and accordingly impinges upon the center of the photodetector 36. As the prism 32 rotates, the position of the point of the object 30 which is focused at the center of the photodetector 36 changes. As shown in FIG. 4C, when the prism 32 is rotated by 180° from the position in FIG. 4A, the position of the point 30c of the object 30 focused at the center of the photodetector 36 is above the optical axis O. More exactly, in these cases as shown in FIGS. 4A to 4C the image is not focused exactly on the photodetector 36 but on the plane 35" forwardly displaced from the photodetector 36. Since the point of the object 30 which is focused substantially at the center of the photodetector 36 changes as the prism 32 rotates, the quantity of light received by the photodetector 36 through the mask or slit 34 periodically changes. Therefore, the output of the photodetector 36 contains an alternating current component in this case, too. Thus, when the objective 31 is displaced axially from the position of the correct focusing, the output of the photodetector 36 contains an alternating current component. The frequency of the alternating current component contained in the output of the photodetector 36 is the same as that of the rotation of the prism 32. Therefore, by detecting the output of the photodetector 36 in the above described arrangement, it can be determined whether the image is precisely focused on a predetermined plane.

In order to electrically detect the position of the objective lens 31 at which the output of the photodetector 36 contains no alternating current component of a frequency equal to the frequency of rotation of the prism 32, an alternating current amplifying circuit is used to amplify the alternating current component of said frequency. By selectively amplifying the alternating current component of said frequency, various noises caused by the periodical movement of something contained in the scene such as a fluttering flag or leaves can be eliminated. Since the frequencies of periodical movements likely to exist naturally within the scene are not very high, the frequency of the periodical movement of the refraction element need not be exceedingly high but should be as high as possible.

The periodical movement of the refraction element may be a rotational or a reciprocal movement. Various mechanisms can be employed for periodically moving the refraction element. The refraction element may be rotated about the optical axis, reciprocated across the optical axis along a straight line or an arc, or moved along a circle around the optical axis.

FIG. 5 shows an example of a mechanism for reciprocating the refraction element. Elements equivalent to those employed in the embodiment shown in FIG. 1 are designated with the same reference numerals as used in FIG. 1. A cam 50 is fixed to a drive shaft 11a of a drive motor 11 and a cam follower 49 fixed to a reciprocating holder 44 is spring urged to follow the cam 50 by means of a tension spring 51. The reciprocating holder 44 has a vibrating prism 40 supported by a transparent plate 41 and is guided to move back and forth by slidable engagement of parallel slots 42 and 43 and guide pins 45 to 48. As the drive motor 11 rotates, the holder 44 reciprocates along the parallel slots 42 and 43. Behind the vibrating prism 40 is provided a focusing lens 26, a mask 27 and a photodetector 28 similarly to the arrangement as shown in FIG 1.

Another example of the mechanism for periodically moving the refraction element is shown in FIG. 6, wherein the elements equivalent to those employed in the foregoing embodiments are designated by the same reference numerals. A cam 63 is fixed to the drive shaft 11a of the drive motor 11 and a cam follower lever 62 is spring urged to follow the cam 63 by means of a tension spring 64. The lever 62 has at an end thereof a holder 61 which holds a vibrating prism 60. As the motor 11 rotates, the lever 62 swings back and forth to reciprocate the vibrating prism 60 along an arc.

As the refracting element, various types of prism can be employed. Several examples of the refracting element are shown in FIGS. 7A to 7J. These prisms are reciprocated in the direction as indicated by arrows. The shape of the prisms viewed from front may be as shown in FIG. 8A or 8B. The prisms as shown in FIGS. 7A, 7C, 7D and 7G may be rotated about their centers. FIGS. 9A and 9B shows an example of the prism as shown in FIG. 7D which is rotated about its center. FIGS. 10A and 10B show still another example of the prism rotated about its center. The prism as shown in FIGS. 10A and 10B is comprised of two semi-circular prisms combined to form a split image type prism. Another example of the prism which is rotated about its center is shown in FIGS. 11A and 11B.

In order to amplify the variation in the output level of the photodetector caused by the vibration or periodical movement of the vibrating prism, it is desirable to provide a mask or slit in front of the photodetector. When a slit is provided, the slit should extend in the direction perpendicular to the direction in which the image reciprocates as the vibrating prism vibrates in case where the prism is reciprocated, i.e. not rotated. When the prism is rotated, slit may be in any direction. FIGS. 12A to 12G show various examples of the mask to be provided in front of the photodetector. The masks as shown in FIGS. 12C and 12D are suitable for a system where the image is rotated or moved along a circle. The mask shown in FIG. 12E has a semicircular opening and is suitable for a system where the image moves up and down or rotates. The mask shown in FIG. 12F is suitable for a system where the image moves up and down. The mask shown in FIG. 12G is suitable for a system where the image rotates or moves along a circle.

Now several examples of the electric circuit for detecting the alternating current component of the output of the photodetector will be described in detail with reference to FIGS. 13 to 16.

A preferred embodiment of an electric circuit for automatically focusing an image by controlling the position of an objective in accordance with the output of a photodetector will be described hereinbelow with reference to FIG. 13. Behind an objective 80 is provided a refraction element 81 which is periodically moved in a plane perpendicular to the optical axis O of the objective. A focusing lens 82 is provided behind the refracting element 81 to focus an image once formed around the element 81 on a photodetector 83 located therebehind. An A.C. amplifier 84 is connected with the photodetector 83 to amplify an alternating current component of predetermined frequency in the output of the photodetector 83. The amplified A.C. component is rectified through a rectifier 85. The output of the rectifier 85 indicates the condition of the focus. When the image is focused precisely on the refraction element 81, the output of the rectifier becomes zero. When the image is not focused thereon, the rectifier 85 shows a positive output having a level corresponding to the displacement of the image plane from the plane on which the refraction element 81 is located. The output of the rectifier 85 is sent to a Schmidt circuit 86 connected with a motor driving circuit 91 by way of a direction control circuit 90 and also to a switching circuit 87. The direction control circuit 90 controls the direction of drive of a servomotor 92 and is connected with a comparing circuit 89 which compares a signal from the switch circuit 87 with a signal from a memorizing circuit 88. The switching circuit 87 first transmits the output of the rectifier to the memorizing circuit 88 so that the latter memorized the output and then transmits the output of the rectifier 85 to the comparing circuit 89. The comparing circuit 89 compares the output from the two circuits 87 and 88 and determines the direction in which the motor 92 is to be rotated. When the output from the switching circuit 87 is higher than that from the memorizing circuit 88 the motor 92 is rotated in the direction opposite to the direction in which it has been rotating up till that moment. When the output from the switching circuit 87 is smaller, the motor 92 is allowed to continue rotating in its rotating direction. Thus, when the output becomes zero, the motor 92 is stopped.

Figure 14:
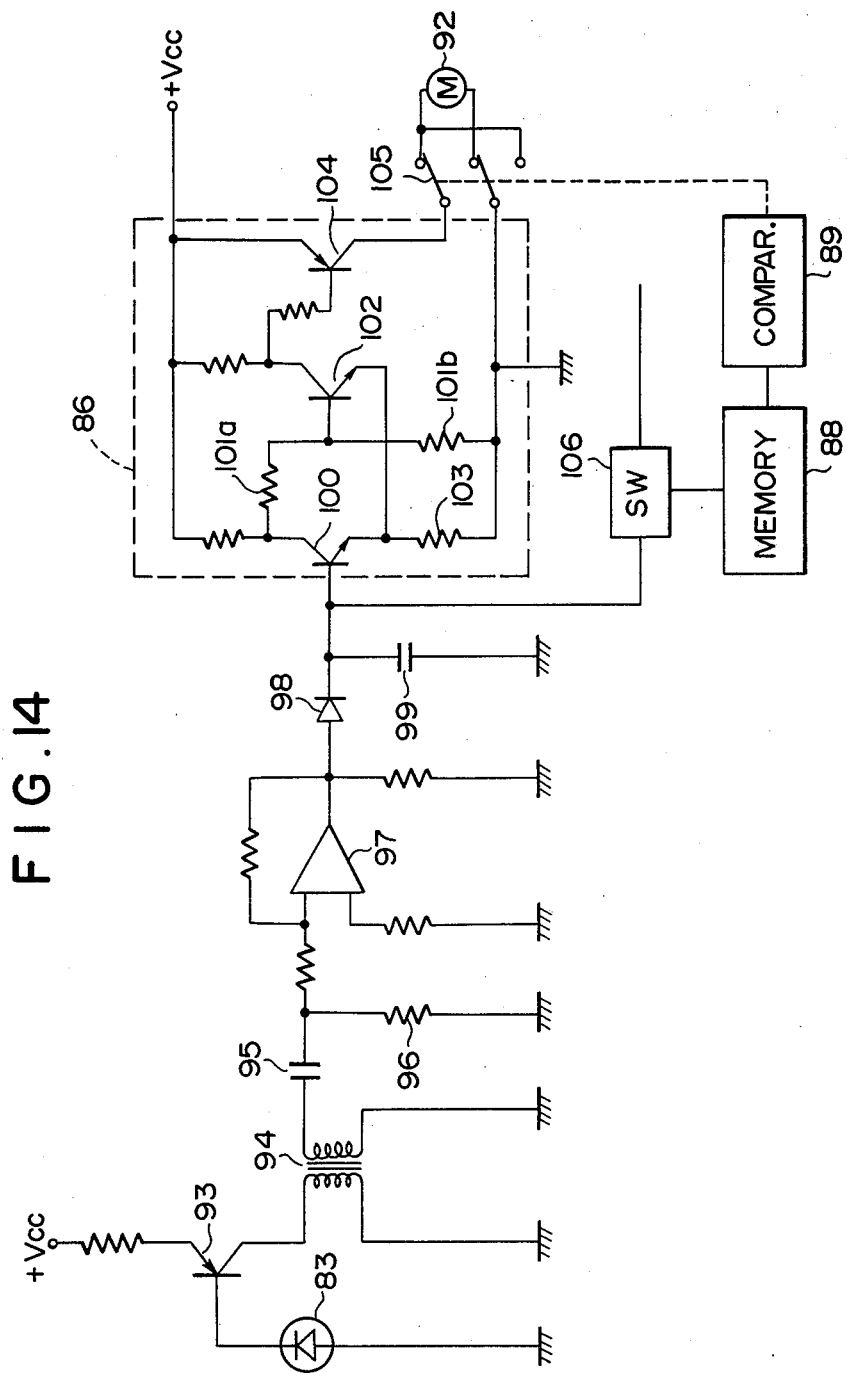
FIG. 14 is a circuit diagram showing another example of an automatic image focusing circuit connected with a photodetector in accordance with another embodiment of the present invention.

Now a circuit used in the above embodiment will be described in detail with reference to FIG. 14. A photodetector 83 such as a photodiode is connected with the base of a transistor 93 the collector of which is connected with a transformer 94 to pick up an A.C. component from the output of the photodiode 83. The A.C. component is filtered through a filter circuit consisting of a capacitor 95 and a resistor 96. Thus, the output of the photodiode 83 is filtered to obtain only an A.C. component having a frequency over a predetermined level. The filtered output is put into an operational amplifier 97, and the output of the operational amplifier 97 is rectified through a diode 98. The rectified output is then smoothed by an integrating circuit consisting of a capacitor 99. The smoothed output is put into the base of the first transistor 100 of a Schmidt circuit 86 to turn on the transistor 100. Thereby, the current which has been flowing through resistors 101a, 101b and the base and the emitter of the second transistor 102 and a resistor 103 starts to flow through the collector and the emitter of the first transistor 100. Thus, the second transistor 102 is turned off. Therefore, the base potential of the third transistor 104 rises to turn on the same and the servomotor 92 is driven through a switch 105. The rectified output from the integrating circuit is sent to a switching circuit 106 at the same time to be memorized by a memorizing circuit 88 and then put into the comparing circuit 89 to be compared with the memorized output as mentioned hereinbefore. The output of the comparing circuit 89 is transmitted to the switch 105 to reverse the direction of drive of the motor 92 when required. When the image plane is displaced far from the refraction element 81, the output of the Schmidt circuit 86 is high to drive the motor 92 fast. When the image plane approaches the refraction element 81, that is, as the image becomes sharper on the film in the camera, the speed of drive of the motor 92 is lowered, thereby the image is focused quickly and smoothly.

Figure 15B:
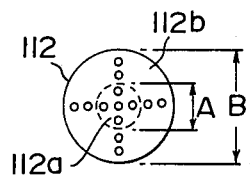
FIG. 15B is a front view of a mask employed in the arrangement as shown in FIG. 15A.
Figure 15C:
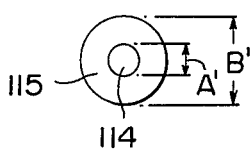
FIG. 15C is a front view of a photodetector consisting of two photodetector elements employed in the arrangement as shown in FIG. 15A.
Figure 16:
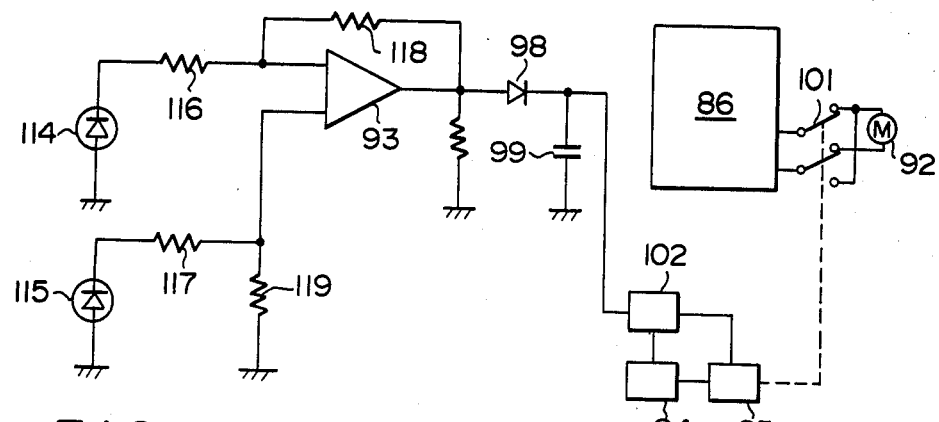
FIG. 16 is a circuit diagram showing still another example of an automatic image focusing circuit connected with two photodetector elements.

In the above described embodiment, A.C. components other than the A.C. component caused by the vibrating prism are eliminated to a substantial extent. However, in practice use, it is desirable to eliminate such noise as completely as possible. Further, it might happen that a noise A.C. component should have the same frequency as that of the vibrating prism. In order to completely eliminate such noises, a further preferred embodiment of the present invention employs two photodetectors as will be described in detail hereinbelow with reference to FIGS. 15A to 15C and FIG. 16. As shown in FIG. 15A, a refraction element 110 is fixed to a transparent plate 111 at the center thereof. Immediately behind the refraction element 110 is provided a mask 112 of the type shown in FIG. 12C. The image formed on the transparent plate 111 is focused on a combination of two photodetectors 114 and 115 by means of a focusing lens 113. The mask 112 has a number of perforations and has two sections, 112a which corresponds to the refraction element 110 and 112b corresponding to the transparent plate 111. As shown in FIG. 15B, the central portion 112a has a diameter A and the marginal portion 112b has a diameter B. The combination of the photodetectors 114 and 115 consists of a central photodetector 114 which has a face 114a to receive light passing through the refraction element 110 and the central portion 112a of the mask 112, and a marginal photodetector 115 which has a marginal face 115a to receive light passing through the transparent plate 111 and the marginal portion 112b of the mask 112. As shown in FIG. 16, the two photodetectors 114 and 115 are connected with an operational amplifier 93 by way of resistors 116 and 117 of equal resistance. The resistors 118 and 119 connected between one input and the output of the operational amplifier 93 and between the other input of the operational amplifier 93 and the ground, respectively, are of the equal resistance. Other elements connected therewith are all the same as those employed in the foregoing embodiment as shown in FIG. 14. The operational amplifier 93 gives an output representing the difference between the input from the first photodetector 114 and the input from the second photodetector 115. When the two inputs become equal, the operational amplifier 93 gives zero output. Even if the scene includes an object which flutters at a frequency equal to that of the periodical movement of the refraction element 110, the A.C. component resulting therefrom is not taken out through the operational amplifier 93. Only when the output of the photodetector 114 contains an A.C. component different from that contained in the output of the second photodetector 115, is the A.C. component transmitted to the rectifier 98 and the integrating circuit 99.

Figure 17A:
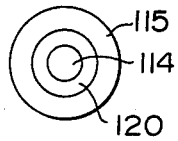
FIGS. 17A and 17B are front views showing example arrangements of the two photodetector elements which can be adopted in the circuit as shown in FIG. 16.
Figure 17B:
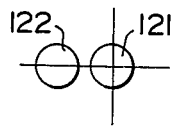

In the above described embodiment as shown in FIGS. 15A to 15C and 16, there is a problem in that the vibrating image passing through and refracted by the refraction element 110 will partly pass through the perforations in the marginal section 112b of the mask 112. The light partially passing through these perforations will lower the performance of the control circuit. Therefore, it is desirable to provide a gap between the central photodetector 114 and the marginal photodetector 115 as shown in FIG. 17A, in which the gap is indicated with a reference numeral 120. Further, it is also possible to solve the above problem by separating the two photodetectors as shown in FIG. 17B, in which one photodetector 121 is located on the optical axis and the other 122 is located apart from the optical axis.

Figure 18:
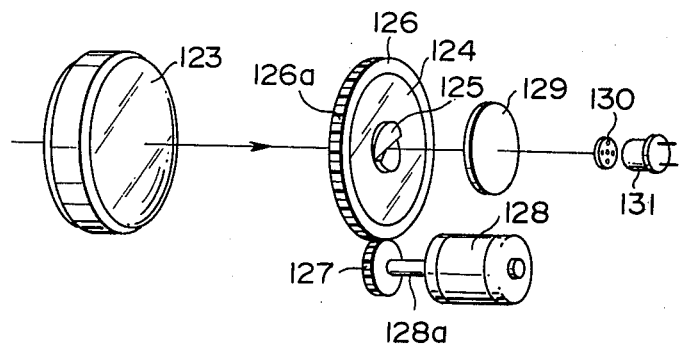
FIG. 18 is a perspective view of a focusing system in accordance with another embodiment of the present invention wherein focusing is accomplished manually in accordance with an indicator which indicates the condition of focusing.
Figure 19:
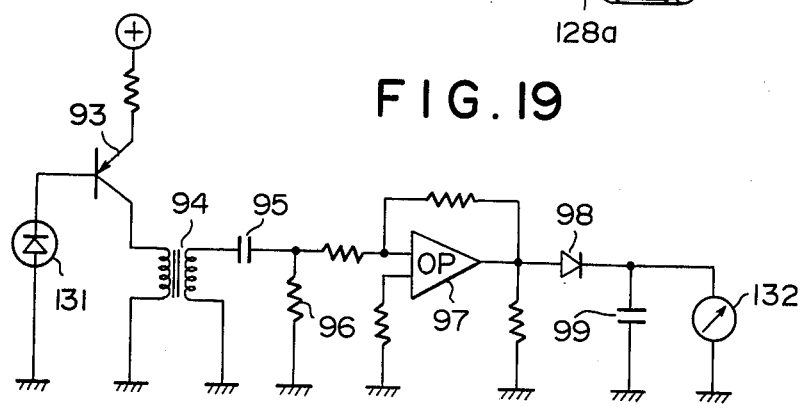
FIG. 19 is a circuit diagram which shows an example of a circuit for use in the embodiment of this invention shown in FIG. 18 for indicating the condition of focusing on a meter.

In the above described embodiments, the objective is automatically controlled by a servomotor to focus an image. However, it should be noted that an indicator may be connected with the circuit so that the condition of focusing is indicated and the operator can easily focus the image by viewing the indicator. One example using an indicator instead of a servomotor controlling means is indicated in FIGS. 18 and 19. Referring to FIG. 18, behind an objective 123 is provided a transparent plate 124 which holds at the center thereof a refraction element 125. The transparent plate 124 carries on the periphery thereof an annular frame 126 having teeth 126a on the periphery. The teeth 126a are meshed with a gear 127 fixed to a drive shaft 128a of a motor 128. Behind the transparent plate 124 is provided a focusing lens 129 to focus an image formed on the plate 124 onto a photodetector 131 through a mask 130. The photodetector 131 is connected with a circuit as shown in FIG. 19 similar to said circuit as shown in FIG. 14. The elements equivalent to those shown in FIG. 14 are designated with the same reference numerals. The photodetector 131 corresponds to said photodiode 83 in FIG. 14. The output of the integrating circuit consisting of a capacitor 99 is put into an ammeter 132 which indicates the level of the output of the integrating circuit that indicates the degree of displacement of the plane of the image from the refracting element 125. The indicator 132 may be located within a field of view of a viewfinder in the camera so that the photographer is able to know the condition of focus by the pointer of the ammeter or indicator 132.

I claim:

1. An automatic image focusing device for use in a camera or the like comprising:
    an objective axially movable for focusing,
    means for axially moving the objective in accordance with an electric signal given thereto,
    a light refracting optical element located substantially on an image plane of the objective, said light refracting optical element being fixed to a transparent plate extending parallel to said image plane and the transparent plate being periodically moved in a plane parallel to the image plane,
    means for periodically moving said light refracting optical element in a plane parallel to said image plane at a predetermined frequency,
    a photodetector located behind said light refracting optical element for receiving light passing therethrough and giving an output representing the quantity of light received thereby,
    a focusing lens provided between the light refracting optical element and the photodetector for focusing an image formed on said image plane onto said photodetector, and an electric control circuit connected between the photodetector and said means for moving the objective, said control circuit including an alternating current amplifier which amplifies an alternating current component contained in the output given by the photodetector, a drive means for driving said objective moving means in accordance with the amplified alternating current component, and a means which selectively amplifies an alternating current component having a frequency equal to said predetermined frequency at which the light refracting optical element is periodically moved.

2. An automatic image focusing device as defined in claim 1 wherein said transparent plate is rotated about an axis perpendicular to the image plane.

3. An automatic image focusing device as defined in claim 1 wherein said transparent plate is reciprocated in a plane parallel to the image plane.

4. An automatic image focusing device for use in a camera or the like comprising:

an objective axially movable for focusing, means for axialling moving the objective in accordance with an electric signal given thereto, a light refracting optical element located substantially on an image plane of the objective, means for periodically moving said light refracting optical element in a plane parallel to said image plane at a predetermined frequency, a photodetector located behind said light refracting optical element for receiving light passing therethrough and giving an output representing the quantity of light received thereby, a focusing lens provided between the light refracting optical element and the photodetector for focusing an image formed on said image plane onto said photodetector, and an electric control circuit connected between the photodetector and said means for moving the objective, said control circuit including an alternating current amplifier which amplifies an alternating current component contained in the output given by the photodetector, a drive means for driving said objective moving means in accordance with the amplified alternating current component, and means for detecting the direction in which said objective moving means is to be driven by said drive means, said direction detecting means comprising switch means for selecting the direction of drive connected with said drive means, a memorizing circuit for memorizing an output of said alternating current amplifier, a comparing circuit which receives two outputs and compares the two outputs and gives an output which indicates which of the two outputs is smaller than the other, a switching circuit connected between said alternating current amplifier and said memorizing circuit and between said amplifier and said comparing circuit for transmitting the output of the amplifier first to said memorizing circuit and then to said comparing circuit, and means for transmitting the output of the comparing circuit to said direction selecting switch means, whereby said switch means controls the drive means by reversing the direction of drive when the output of the comparing circuit indicates that the output from the switching circuit is larger than the output from the memorizing circuit.

* * * * *